(12) United States Patent
Durante et al.

(10) Patent No.: US 8,034,741 B2
(45) Date of Patent: Oct. 11, 2011

(54) CAPTURE OF MERCURY FROM A GASEOUS MIXTURE CONTAINING MERCURY

(75) Inventors: Vincent A. Durante, West Chester, PA (US); Zhengtian Xu, West Chester, PA (US); Glenn S. Shealy, Hockessin, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 1780 days.

(21) Appl. No.: 11/270,116

(22) Filed: Nov. 9, 2005

(65) Prior Publication Data

US 2007/0104631 A1 May 10, 2007

(51) Int. Cl.
*C01B 31/08* (2006.01)
(52) U.S. Cl. ..................................... 502/417
(58) Field of Classification Search ............... 502/417
See application file for complete search history.

(56) References Cited

U.S. PATENT DOCUMENTS

| | | | |
|---|---|---|---|
| 4,500,327 A * | 2/1985 | Nishino et al. | 95/134 |
| 5,352,647 A * | 10/1994 | Suchenwirth | 502/417 |
| 6,322,613 B1 | 11/2001 | Wojtowicz | |

* cited by examiner

*Primary Examiner* — Stuart Hendrickson
(74) *Attorney, Agent, or Firm* — E. Alan Uebler, P.A.

(57) ABSTRACT

Compositions are provided, derived from chemical treatment of carbonaceous fiber felt forms or other carbonaceous substrates, that exhibit both high efficiency and capacity for mercury capture from flue gases and the like. These compositions are superior to known compositions, particularly with regard to their performance under severely deactivating conditions. The compositions result from the pyrolysis of certain specific sulfur bearing compounds while in contact with activated carbon powders, activated carbon fibers, or with other carbonized forms. Precursor compounds to these novel mercury-binding compositions contain structural moieties that may be represented as:

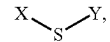

where X, Y are individual atoms or are functional groups consisting of several atoms, such that the atom bonding to sulfur is not hydrogen. X and Y can be linked in cyclic structures, either directly or through other atoms.

10 Claims, 3 Drawing Sheets

CAPTURE OF MERCURY FROM A GASEOUS MIXTURE CONTAINING MERCURY

FIELD OF THE INVENTION

The invention relates to a composition and apparatus useful in the capture and removal of mercury from combustion gas streams. The invention is particularly suitable for the capture of mercury from gas streams which additionally contain $SO_2$ and $NO_x$ at temperatures as high as about 135-225° C.

BACKGROUND OF THE INVENTION

In March, 2005, the United States became the first nation to regulate mercury (Hg) emissions from coal-fired power plants. At that time, the Environmental Protection Agency (EPA) issued its Clean Air Mercury Rule (CAMR), which affects all utilities nationwide, and which has, as its objective, the reduction of utilities' Hg discharges from the then-current level of 48 ton/yr to 15 ton/yr by 2018, about a 70% reduction. Mandatory emission caps, declining with time, are coupled with severe penalties for noncompliance. Clearly, coal-fired power plants, and all other facilities which discharge gaseous emissions containing mercury, have incentives, financial and otherwise, to implement new and low-cost ways to reduce Hg emissions and improve the effectiveness of their pollution control equipment.

Conventional methods for removing particulates from gas streams have included various configurations of filter elements, some of which are self-supporting and some of which are mounted within suitable support structures. Such filter elements include filter bags, filter tubes, filter cartridges, canisters, and flat panels. These various filtration components are typically supported and housed in an installation termed a "baghouse".

Additionally, activated carbon (AC) powders have been used for the capture of mercury and other contaminants from flue gas streams from power plants, incinerators, crematoria and other, similar, mercury-containing discharges. For example, commonly assigned U.S. patent application Ser. No. 10/272,487, filed Oct. 16, 2002, discloses a filtration system uniquely suited for the capture of mercury from flue gases. That system, which is incorporated here by reference, includes a filter element and an adsorbent component having a mercury-capturing component positioned on the downstream side of the filter element.

U.S. Pat. No. 6,322,613B1 discloses a process for recovering mercury from a gaseous mixture in which a carbonaceous feed stock, in particular scrap tires and rubber waste, is first pyrolyzed and activated to produce an activated carbon sorbent having a sulfur content of at least 3 weight percent (col. 1, lines 60-65), and then a gas stream containing mercury is passed over this sorbent at a low temperature, e.g. 50-200° C., thereby producing a mercury-containing sorbent and a stripped gas stream. This is followed by passing a regenerating gas stream over the sorbent, at a higher temperature, to produce a mercury-rich gas stream and to regenerate the sorbent (col. 2, lines 1-8).

In addition, the patent literature and the general technical literature are replete with references disclosing elemental sulfur in use in various processes for stripping mercury from flowing gas streams, including from combustion flue gases.

None of this known, voluminous art, however, discloses or suggests a composition and a process, useful in the capture of mercury from a gaseous mixture containing $SO_2$ and $NO_x$ and mercury, which have a mercury capture capacity from such gaseous mixtures exceeding 10 mg Hg per gram of adsorbent. Indeed, a mercury capture capacity from such gaseous mixtures exceeding 100 mg Hg per gram adsorbent is made possible by the instant invention, providing an advantageous composition for use in meeting the aforesaid EPA regulations.

SUMMARY OF THE INVENTION

A composition for use in the capture of mercury from a gaseous mixture containing mercury is provided. The composition comprises a high-surface-area activated carbon substrate supporting thereon the product of the pyrolysis, in situ on said carbon substrate surface, of at least one sulfur compound having the characteristic structural moiety:

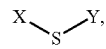

wherein neither X nor Y is H, no more than one of X or Y is S or O, X and Y may be linked in a cyclic structure, and the bonds connecting X or Y to S may be single, double, or inner-sphere dative bonds. With reference to F. Basolo and R. G. Pearson, *Mechanisms of Inorganic Reactions*, J. Wiley and Sons, pub., NY 1$^{st}$ ed., 1958, pp. 3ff, and by definition for use herein, an inner-sphere dative bond, in coordination chemistry, is a localized bond between a central ion, usually a metal cation, and a directly attached ligand, in this case, a neutral sulfur compound or sulfur-bearing anion, in which a pair of electrons is donated by the "S" ligand to an empty orbital localized on the metal cation, usually without change in the formal oxidation state of the metal ion. The carbon content of the composition of this invention is at least fifty percent (50%) by weight and the composition has a surface area of at least 200 m$^2$g$^{-1}$ B.E.T., and it preferably has a surface area of at least 500 m$^2$g$^{-1}$ B.E.T.

The composition exhibits a mercury capture capacity exceeding 10 mg Hg per gram of composition, and can have a mercury capture capacity exceeding 100 mg Hg per gram of the composition.

The activated carbon substrate may comprise activated carbon in the form of powder, carbon fibers, carbon felt or other physical forms of activated carbon.

A preferred sulfur compound is dimethyl sulfoxide, but other compounds are suitable such as, without limitation, 2-amino-5-mercapto-1,3,4-thiadiazole (5-amino-1,3,4-thiadiazole-2-thiol), 2-benzoylamino-3-(4-chloro-phenyl)-thioacrylic acid S-(2-mercapto-4-methyl-phenyl)ester, zinc diethyldithiocarbamate, a mixture of dimethyl sulfoxide and 2-amino-5-mercapto-1,3,4-thiadiazole (5-amino-1,3,4-thiadiazole-2thiol) and a mixture of dimethyl sulfoxide and zinc diethyldithiocarbamate.

Apparatus useful in the capture of mercury from a gaseous mixture which contains mercury, is also provided, the apparatus including a component comprising a gas-permeable support member through which the mixture passes. The support member has thereon a composition comprising a high-surface-area activated carbon substrate on which is supported the product of the pyrolysis, in situ on the carbon substrate surface, of at least one sulfur compound having the characteristic structural moiety:

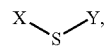

wherein neither X nor Y is H, no more than one of X or Y is S or O, X and Y may be linked in a cyclic structure, and the bonds connecting X or Y to S may be single, double, or inner-sphere dative bonds. The activated carbon substrate may be activated carbon as described above. The support member may be tubular, or it may be in the form of a flat sheet, and this sheet may be pleated to increase its effective geometric area. The filter component may be such that the support member is a monolith housed in a cannister, a filter in a baghouse, an insert in a pulse jet filter bag, in the form of a moving belt positioned downstream of an electrostatic precipitator, or in essentially any form susceptible of physical placement within a flowing gas stream.

Also included is a process for removing mercury from a gaseous mixture which contains mercury, the process comprising passing the gaseous mixture through a gas-permeable support member on which is supported the composition described above. This process is especially suited for stripping of Hg from streams also containing a substantial amount of at least one of $SO_2$ and $NO_x$, and is particularly suitable wherein the gaseous mixture contains a substantial amount of $SO_2$. This process is effective where the gaseous mixture passing through the support member is at a relatively high temperature, e.g., in the range of about 135-225° C.

Still further, a process is provided for the preparation of the aforesaid composition for use in the capture of mercury from a gaseous mixture which contains mercury. This process comprises:

(a) dissolving or melting at least one sulfur compound having the characteristic structural moiety:

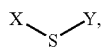

wherein neither X nor Y is H, no more than one of X or Y is S or O, X and Y may be linked in a cyclic structure, and the bonds connecting X or Y to S may be single, double, or inner-sphere dative bonds, thereby (b) producing a mobile, liquid-phase sulfur compound, (c) heating a high-surface-area carbonaceous precursor to about 40-80° C. in air or, optionally, in an inert atmosphere, (d) impregnating said carbon precursor with the liquid-phase sulfur compound, (e) pyrolyzing the sulfur compound impregnated in the carbon precursor in air at a temperature sufficient to decompose at least a portion of the sulfur compound, but not so high as to decompose predominantly to elemental sulfur, and (f) cooling the pyrolyzed composition so produced in air, thereby providing the composition of the invention for use in the capture of mercury. The pyrolyzing is preferably carried out at a temperature of 190-225° C. for about 30 minutes. This process may include repeating steps (a) through (d) prior to carrying out step (e) in order to increase the total concentration of the sulfur compound contained in the composition.

BRIEF DESCRIPTION OF THE DRAWINGS

In the accompanying drawings.

Figure 1:
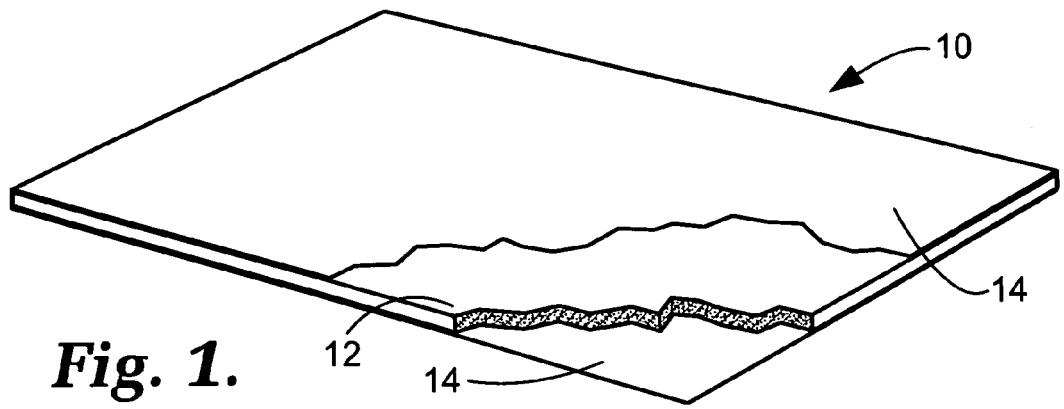
FIG. 1 is a schematic depiction of an activated carbon felt substrate supporting the pyrolyzed, sulfur-containing compound of the invention impregnated therein, sandwiched between optional cover layers.

DETAILED DESCRIPTION OF THE INVENTION AND PREFERRED EMBODIMENTS WITH REFERENCE TO THE DRAWINGS

Provided herein are compositions, derived from chemical treatment of carbonaceous fiber felt forms or other carbonaceous substrates, that exhibit high efficiency and capacity for mercury capture from flue gases and the like, and methods for their preparation. These compositions are superior to known compositions, particularly with regard to their performance under severely deactivating conditions.

The compositions of this invention result from the pyrolysis of certain sulfur bearing compounds while in contact with activated carbon powders, activated carbon fibers, or with other carbonized forms. Functionalized carbon surfaces that exhibit an unusual affinity for mercury at elevated temperatures are believed to characterize these new compositions. Although many compounds of sulfur and several types of activated carbon combinations generate compositions with limited capacity to bind elemental mercury at high temperature in the presence of sulfur oxide gases, only certain of these combinations result in compositions that far exceed most others in capture performance. The particular precursor sulfur compounds of this invention result in functionalized carbon moieties exhibiting superior performance characteristics over those produced from other known sulfur compounds.

The preferred compositions of this invention exceed prescribed values for mercury binding capacity and prescribed values for mercury binding efficiency, as defined hereinbelow, in dynamic flow-adsorption tests that introduce influent simulated flue gas containing water vapor, sulfur and nitrogen oxides, hydrogen chloride and oxygen, along with elemental mercury. Known prior art compositions cannot meet this performance standard.

A method for preparing the active mercury-binding compositions of this invention is as follows: 1) dissolve a suitable precursor S compound, defined below, or mixtures of such compounds into a suitable solvent, or melt the sulfur compound to produce a mobile liquid phase; 2) heat a carbonaceous precursor felt or other carbon form to about 40-80° C. in air or vacuum, or in an inert atmosphere; 3) impregnate the carbon substrate in air or vacuum, or under an inert atmosphere, with the solution or molten S compound; 4) calcinate or pyrolyze the wetted carbon in a muffle furnace in air at a temperature sufficiently high to decompose at least a portion of the sulfur compound but not so high as to decompose the sulfur compound completely to elemental sulfur, for a time sufficient to evolve most of the fumes typically 190-225° C.

for 30 minutes; 5) cool the pyrolyzed samples in air; and 6) blow excess powder, if any, from the dried surface of the pyrolyzed sample.

Steps 1 to 3 above may be repeated several times before step 4, or the entire sequence may be repeated, in order to build up the total S concentration on the pyrolyzed samples to the desired range described below.

Other coating variants may be employed, including fluidized bed coating of powdered activated carbons using gaseous sulfur compounds of the acceptable structures, slurry phase coating of a dispersed carbonaceous powder or fiber, followed by filtration and flash pyrolysis of the wet solids, ultrasonic dispersal of solution across fibers, and vacuum imbibing of carbon with the solution species, both followed by pyrolysis. Other variants of this procedure will be conceivable to those skilled in the art that result in well dispersed sulfur compounds in intimate contact with the carbonaceous substrates prior to the pyrolysis step of the invention.

Pyrolysis temperatures will vary depending on the compound in use and the solvent system employed. For one preferred impregnant, dimethyl sulfoxide as the "suitable sulfur compound" impregnant or when used as a solvent along with another suitable sulfur compound, 200-220° C. is preferred. A preferred maximum upper temperature for pyrolysis is about 359° C., generally, and a preferred lower temperature is 185° C.

Acceptable loading of the sulfur-bearing impregnant can depend on the surface area of the carbon. For activated carbon felts of about 1200 $m^2g^{-1}$, this corresponds to doping levels up to about 50 weight % loading of impregnant after pyrolysis, depending on the specific compound employed. Typically, the preferred range is less than about 25-30% by weight and more than about 2%. Acceptable compositions can be prepared with loadings above about 30%. Within this range of acceptable bulk loading, preferred compositions exhibit 2-10 atomic % sulfur on the surface (by XPS). Upper limits to preferred bulk loadings of impregnant correspond to the minimum amounts sufficient to block a significant number of the active sites formed in the pyrolysis using dynamic mercury adsorption tests of the series. A range of sulfur loading can be estimated experimentally (empirically) using small prototype specimens without exposure of the samples to mercury by examining the inverse gas chromatographs (IGC) of a series of pyrolyzed samples of increasing S/C ratio using the IGC technique employing interacting adsorbates such as butanol. The S/C ratio may be chosen to maximize the peak area of those peaks emanating at temperatures above that of the physisorption peak, usually about 380-400 K in the activated carbon systems. The cumulative areas of the higher temperature peaks emanating above about 400 K reflect the number of accessible surface sites. These experimental areas begin to drop as dopant levels elevate beyond the point at which the surface begins to be blocked in a series of preparations, which is taken as the upper limit of loading (i.e., S/C). Alternatively, B.E.T. surface areas using nitrogen porosimetry methods of a series of preparations of varied S/C can be used to judge the relative degree of surface blockage for various loading levels. Preferred surface areas after loading with sulfur compounds and pyrolysis exceed about 400 $m^2g^{-1}$.

For comparison purpose, it has been found that compositions prepared without the pyrolysis step either result in ineffective binding systems for mercury or in volatile or readily flammable materials that are unacceptable for commercial scale use. One might reasonably expect that the effective compounds for mercury binding result from oxidation of the precursor sulfur compounds during the pyrolysis step in preparation. However, compositions prepared using the expected primary oxidation product of one of the best of the active precursor sulfur compounds is not particularly effective at mercury binding, whether or not the combination of carbonaceous substrate plus sulfur compound is pyrolyzed. The best precursors are found to be not as effective when pyrolyzed onto silica gel as when pyrolyzed onto carbon fiber. Consequently, although not to be bound or limited by any theory of operation, the pyrolysis step on carbon herein may generate unique surface functionalities capable of stoichiometrically or catalytically oxidating and binding zero-valent mercury, and probably containing at least one sulfur and one or several carbon atoms per site. Other atoms such as oxygen may also be present at the site, or at an adjoining site, but at least one lone pair on the sulfur atom is believed to remain available for interaction with mercury, at least as a point of initial attachment. A hypothesis expounding distinct and separate sites for oxidation of, and for subsequent binding of oxidized forms of, mercury also is tenable.

The distinguishing structural characteristic of the precursor sulfur compounds that result in filter systems displaying extraordinary mercury binding efficiency and/or capacity according to the invention is believed to reside in the presence of at least one constrained sulfur atom that is appended to at least two other non-hydrogen atoms. Additional S atoms may be present that are bound to hydrogen and to only one other atom. Other heteroatoms may also be present in these structures.

Acceptable structures for precursor compounds to these novel mercury-binding compositions contain fragments that may be represented as:

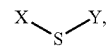

where X, Y are individual atoms or are functional groups consisting of several atoms, such that the atom bonding to sulfur is not hydrogen. X and Y can be linked in cyclic structures, either directly or through other atoms.

Specific acceptable precursor compounds include 2-amino-5-mercapto-1,3,4-thiadiazole, zinc complex of diethyldithiocarbamate, dimethyl disulfide (also known as methanethiomethane), and dimethylsulfoxide. Specific unacceptable precursor compounds, for comparison, include 4,4'-thiobisbenzenethiol, thioacetic acid, and ammonium diethyldithiocarbamate. Other acceptable precursor species include first-row transition metal complexes of dithiocarbamates, dithiocarboxylates, xanthates, dithiophosphinates, dithiocarbonates, trithiocarbonates, thioxanthates, and dialkyldithiophosphates, and the like, so long as at least one sulfur atom is constrained by bonding to two other non-hydrogen atoms in the complex. Coordinate covalent bonding to the metal center is acceptable as one of the bonds to sulfur. These metal complexes usually are not preferred due to one or several ancillary characteristics such as high cost, poor solubility, high decomposition temperature, innate toxicity, hazardous decomposition and other factors not related to mercury binding capacity after pyrolysis onto activated carbon.

The types of carbonized fibers or powders suitable for use according to this invention are carbons having B.E.T. surface areas of at least about 200 $m^2g^{-1}$, preferably at least about 500 $m^2g^{-1}$ as unadulterated materials that have been activated and contain greater than about 70% carbon content. Composite materials containing substantial portions of activated carbon or activated carbon precursors may also be used. A preferred composite material consists of PTFE fibers containing 1 to 95% by weight of activated carbon as filler. Composites containing carbon nanotubes, bucky balls, or other carbon molecular sieve structures are also acceptable as precursors so long as the surface area requirements are met. Although a particular pore structure or topology is not critical to achieve minimal acceptability, preferred carbonaceous forms are those with at least 0.3 mLg$^{-1}$ pore volume in the 10 to 100 nanometer diameter pore size region as measured by nitrogen desorption porosimetry after pretreatment by heating under vacuum to 200° C. for at least 6 hours and assuming equivalent cylindrical pores. Carbons that have been treated with acidic phosphorus compounds as part of their activation procedure are preferred, but this is not critical. Preferred physical forms of carbon, or composites containing carbon, are fibers or felt structures.

Specific embodiments of apparatus for and methods of mercury removal according to the present invention are best provided with reference to the accompanying drawings, wherein FIG. 1 shows a generic schematic depiction of a composite filter construction 10 formed of an activated carbon felt sheet material impregnated with the pyrolyzed product of a sulfur-containing compound as described above, 12, the impregnated carbon felt being sandwiched between optional layers 14 such as, for example, primary dust capture membranes used in bag filters. Filter devices employing the concepts of the invention will be especially suited in bag-houses as bag liners 12 situated behind the primary dust capture membranes 14 because the fly-ash produced in such systems is not contaminated in coal-fired power plants. Thus, sale of this fly-ash would still continue to generate a substantial income stream while the mercury pollutant would be removed, all as shown schematically in FIG. 2.

Figure 2:
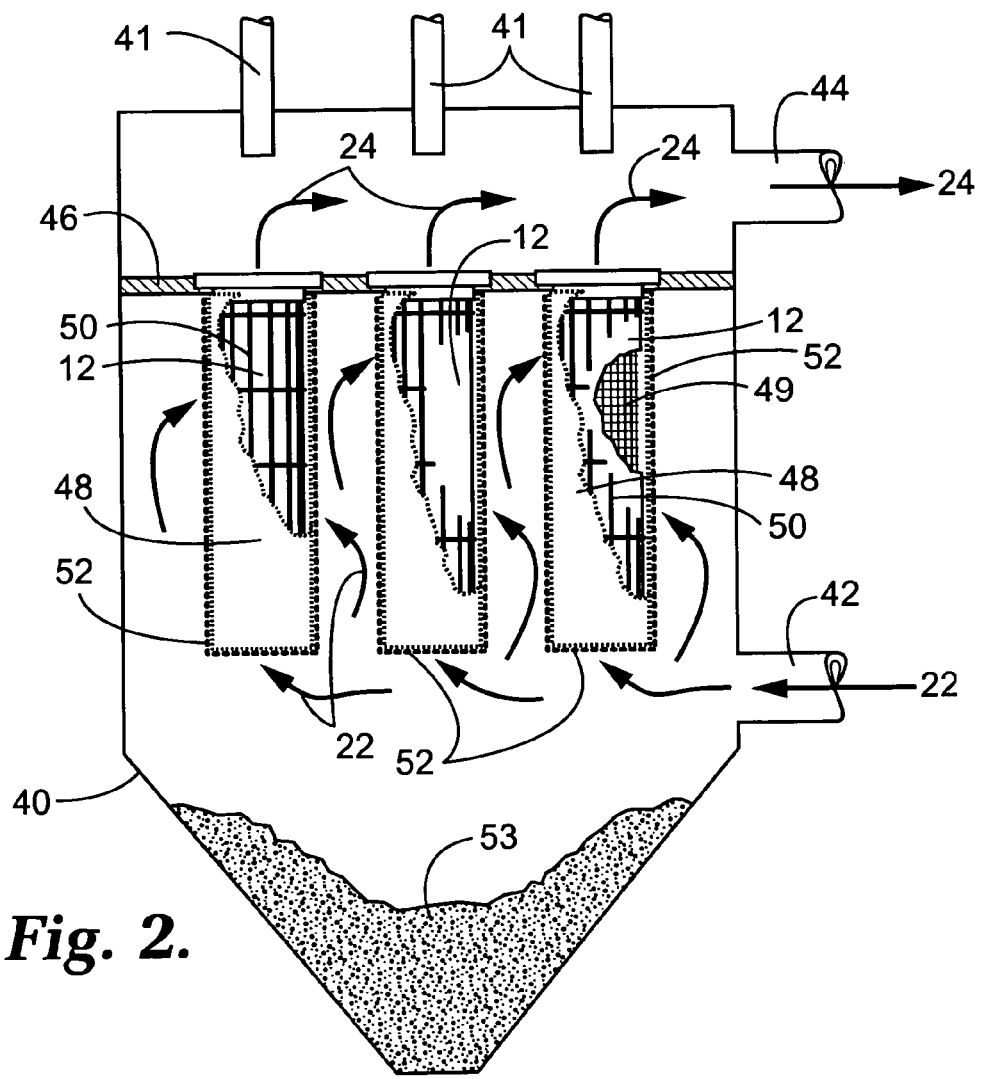
FIG. 2 illustrates, schematically, a baghouse operation wherein the tubular filter media depicted comprise the activated carbon substrate impregnated with the pyrolyzed sulfur-containing compound according to the invention.

With reference to FIG. 2, a typical baghouse operation is depicted in which the tubular composite filter media 12 is supported in housing 40 within cages 50, positioned within and downstream from primary filter bag membrane 48, all held in place by tube sheet 46. Contaminated gas 22 enters the system through inlet 42 as shown, passes through the filter elements 48, 12, where particulates 52 are filtered out while mercury is adsorbed, and the cleansed gases 24 exit the discharge portal 44 as shown. Upon periodic cleaning of particulates 52 by pulsed injection of air through inlets 41, rearwardly, the particulates, and fly ash, collect in the bottom of the hopper 40, for later removal.

Figure 3:
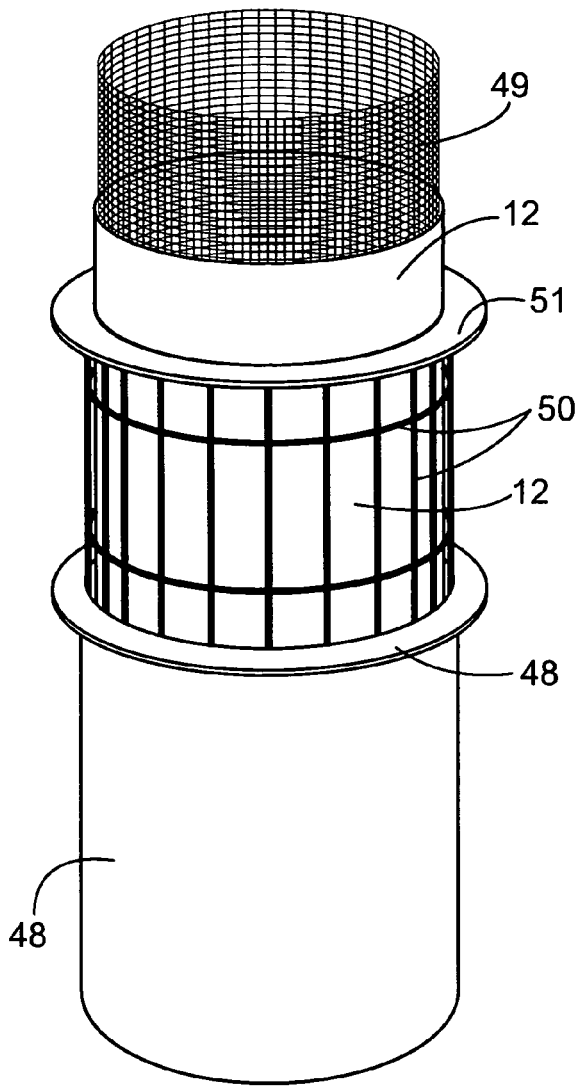
FIG. 3 shows an exploded perspective view of one filter bag in the baghouse of FIG. 2 supported within a flanged metal cage assembly, all held in place by the tube sheet as depicted in FIG. 2.

FIG. 3 shows an exploded perspective view of one filter bag assembly of the plurality of such assemblies shown in FIG. 2. Primary filter bag membrane 48 is supported by stainless steel cage 50, inside of which is held the activated carbon substrate impregnated with the pyrolyzed product 12 according to the invention, in tubular form as shown, held in place by cage 50 and optional inner tubular support grid 49, which also may be stainless steel. This assembly is held in place in tube sheet 46 (FIG. 2) by flange 51.

Figure 4:
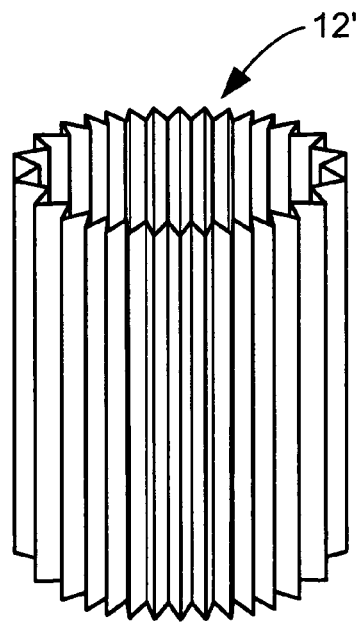
FIG. 4 is a schematic representation of a pleated activated carbon substrate supporting the pyrolyzed product of the invention impregnated therein, this composite assembly being sized to fit a conventional filter baghouse.

FIG. 4 shows one optional variation of a form of filter element 12' of the invention which is pleated, the pleats providing an increased effective filtration area, and thus capacity, sized so as to fit a conventional baghouse.

Figure 5:
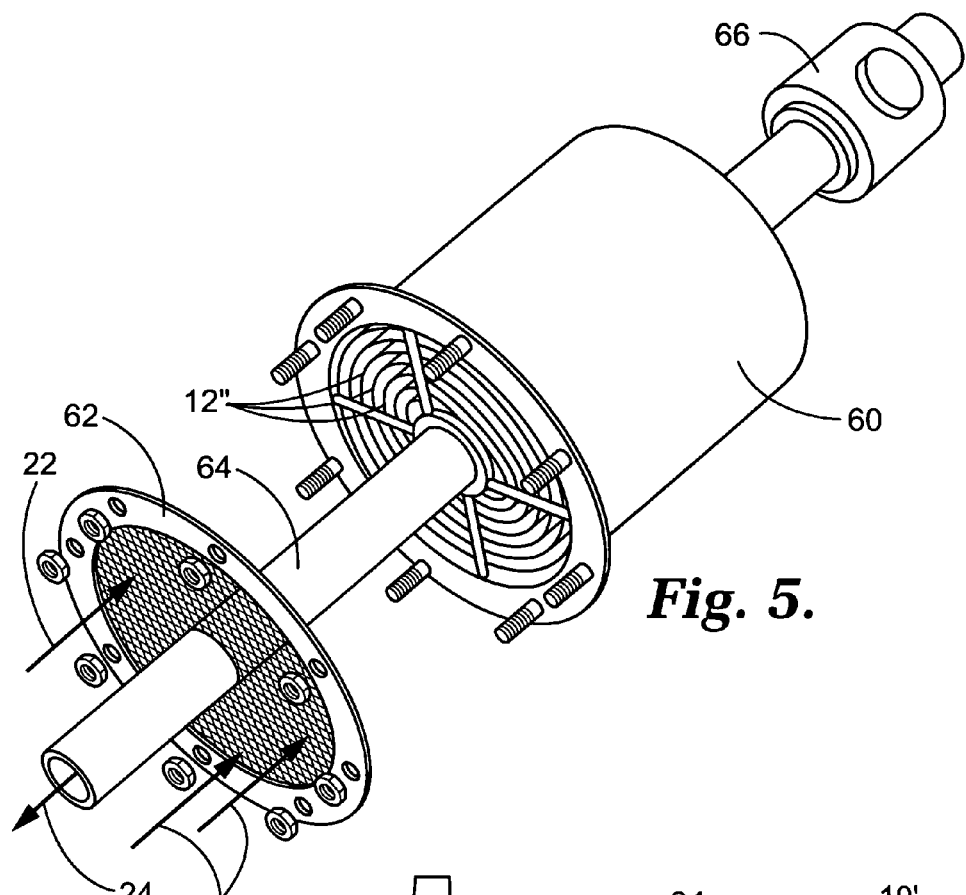
FIG. 5 is an exploded perspective view of the filter media of the invention mounted as a monolith housed within a cannister.

FIG. 5 shows a filter element of the invention 12" incorporated as a spirally oriented monolith filter housed within a cannister body 60 having inlet screen 62 through which the contaminated gas 22 passes. After decontamination, the cleansed gas 24 passes outwardly through evacuation channel 64. A valved pulsed air supply 66 runs into the cannister housing 60 to supply pulsed air to clean particulates from the filter element, the details of which are not shown.

Figure 6:
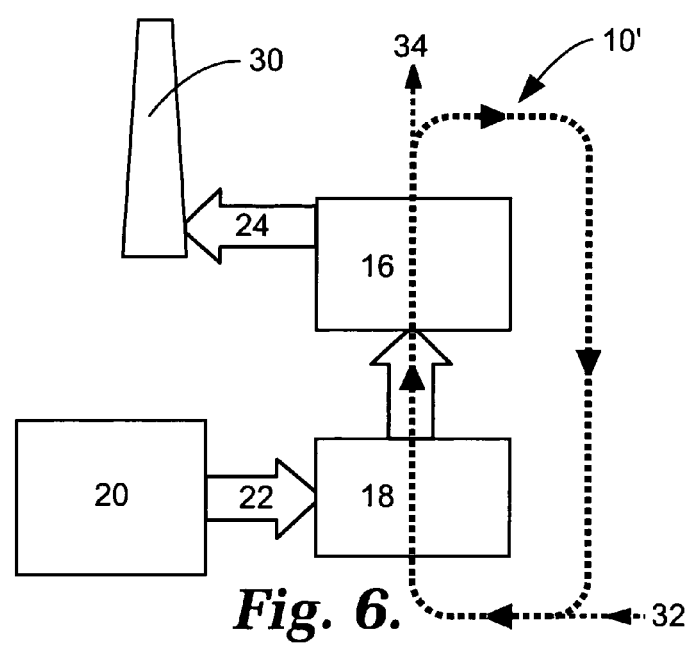
FIG. 6 is a schematic diagram of filtration apparatus and a process for removing Hg from a gaseous stream by passing the gas through the filter media according to the invention in the form of a moving belt positioned downstream of an electrostatic precipitator.

FIG. 6 depicts schematically the apparatus and process for stripping mercury from a gas stream 22 containing mercury produced by a typical incinerator or furnace 20, in which the contaminated gas 22 is passed first through an electrostatic precipitator 18 and then through a mercury adsorber 16. Passing continuously through the system is the moving belt 10', which is to be constructed essentially as shown in FIG. 1, with the sulfur-compound-treated, activated carbon substrate 12 (not shown) supported by flexible mechanical support membrane(s) 14 (also not shown). As the moving belt assembly 10' passes continuously through the system, particulates and fines may be withdrawn at location 34 and activated carbon impregnant may be regenerated and/or replaced at location 32, making the system essentially a continuous operation. Decontaminated gas 24 is continuously discharged at stack 30, depicted schematically as shown.

Included below are results of examples performed to demonstrate the mercury binding (capture) efficiencies and capacities of the compositions according to this invention. In these examples, certain tests are described and the results thereof are reported, and those tests are substantially set out in the aforementioned, commonly owned, U.S. patent application Ser. No. 10/272,487, previously incorporated hereinabove by reference thereto, modified as described below. Those specific tests include:

(1) B.E.T. Method for Surface Area Determination;
(2) Mercury Capture Efficiency and Capacity Test;
(3) Ontario-Hydro Test; and
(4) Frazier Test.

Herein, the Mercury Capture Efficiency and Capacity Test was modified from the test described in Ser. No. 10/272,487 in that the composition of the simulated flue-gas stream, the inlet mercury concentration, the space-velocity, and the testing temperature were changed as described in detail below. Additionally, a tin-chloride-based gas scrubber (impinger bubbler), similar in composition to that used in the Ontario-Hydro Test, was installed in the reactor train after the reduction furnace to ensure complete reduction of ionic mercury compounds to the zero-valent state when HCl and nitrogen oxides are present in the gas stream. The impinger solution was replenished with fresh solution frequently. The simulated flue-gas composition consisted of the following unless otherwise noted in the data tables:

| | |
|---|---|
| $H_2O$ | 4 vol. percent |
| $O_2$ | 6 vol. percent |
| $SO_2$ | 80 ppm |
| NO | 300 ppm |
| HCl | 4 or 50 ppm |
| Hg | 33-1000 ppb (varied as noted in the examples) |
| $N_2$ | Balance |

The isothermal test temperature was 150±2° C. The face velocity was varied between 2 and 8 ft/min, as noted in the data table, infra. Inlet mercury concentration was varied between 33 and 1000 ppb, also as noted. Test results using this test method on materials described in the Examples are tabulated in Table 2, infra.

A test, defined herein as the Alfa Screening Test, also has been applied in some of the following Examples. This mercury adsorption test is a rapid screening test of shorter duration than the comprehensive Mercury Capture and Efficiency Test described above and is designed to estimate only relative initial mercury removal efficiency of solid adsorbents in the presence of $SO_2$ and other acid gas components, but not total adsorption capacity of the test sample for mercury. Similarly, die-cut porous felt samples of fixed geometric area were exposed to a flow-through gas stream containing a fixed mercury concentration for a prescribed time period at constant temperature and gas flow rate. Destructive analysis to measure total mercury adsorbed was performed on each solid sample after exposure, grinding, and homogenization. Data also can be normalized to a constant weight-of-substrate basis, which is particularly useful to rank powdered samples in packed beds, but this latter method is subject to weighing imprecision introduced by the adsorption or desorption of non-mercury components during any given run. The relative precision of this Alfa Screening Test is less than that of the Mercury Capture Efficiency and Capacity Test, as practiced, but it is particularly useful to establish gross relative performance of prototypes for initial mercury removal efficiency.

The Alfa test rig was plumbed using fluoropolymer tubing to deliver a nitrogen stream from a mass flow controller to a set of commercial mercury-diffusion tubes [Vici Metronics Instruments, Houston, Tex.] in a glass U-tube placed in a constant temperature bath nominally held at 75° C. Mercury concentration introduced to the stream was well below the concentration corresponding to the mercury vapor pressure at room temperature. Constancy of the mercury concentration with time was ensured between test samples by occasional monitoring of the stream after the permeation tube by diverting the stream to a secondary gas piping via a two-way valve, diluting the diverted stream with a fixed amount of nitrogen flow, and using a Genesis model Hg253 monitoring device to monitor gaseous mercury concentration as a function of time and with bath temperature changes, after dilution. During an actual run, the mercury-containing gas stream did not go to the Genesis monitor but was passed through an aqueous 15% HCl impinger to introduce water and HCl at a coupled ratio. It was necessary to run the impinger for at least 30 minutes before inserting a test sample downstream to ensure that steady-state was reached regarding soluble mercury. The acid concentration output by the bubbler was checked by sparging it through water and measuring pH as a function of time. NO, air, $SO_2$, and additional nitrogen gases were introduced from cylinders through appropriate check valves into the gas stream after the HCl impinger via microrotameters fitted with Viton O-ring seals. A glass vessel packed with glass beads downstream of the gas introduction point served as a mixer. The room temperature mixed gases were directed to a borosilicate or quartz glass sample test chamber housed in a clamshell furnace fitted with appropriate thermocouples and controlled with a voltage proportional controller and an over-temperature shutoff device. A test sample of a porous filter prototype was cut with a circular die and mounted between glass-filled PTFE mounting rings constructed in-house (ID=0.750 inch) and clamped between borosilicate tubing with flared ends [Pesce Lab Sales, Kennett Square, Pa.] housed within the furnace, held nominally at 170±5° C. The front portion of the tube leading to the sample served as a gas pre-heater. For powdered samples, a packed bed of appropriate weight was placed in a different sample holder containing a sintered quartz disk to hold the powder in place. A bypass line was installed around the sample holder using 3-way valves at each juncture. A secondary mercury trap containing commercially-available iodated carbon [Barneby-Sutcliffe] was placed downstream of the furnace and was also analyzed after each run to help close material balance, infra. The outlet gas stream was vented to a scrubber system operating at atmospheric pressure, then vented to a laboratory hood. Nominal gas stream concentrations and flows used for the test were:

| | |
|---|---|
| $O_2$ | 8 vol. % |
| $H_2O$ | 2 vol % |
| $SO_2$ | 160 ppm |
| NO | 240 ppm |
| HCl | 20 ppm |
| Hg | 0.56 ppm |
| Gas flow rate | 200 mL/min, NTP |
| Air to cloth ratio | 8 ft/min |

After equilibration of flows, temperature, and concentrations with the sample bypassed, each sample was put on stream and exposed for 1 hour, then the gas stream again was diverted back to bypass mode. The sample was removed, humidity equilibrated, weighed, and ground, diluted with 500 mg of ground, virgin activated carbon fiber (unexposed) and homogenized. Mercury analysis of the solid was conducted with a commercial pyrolysis/Zeeman-effect-corrected cold vapor atomic absorption analyzer manufactured by Ohio Lumex model RA-915/RP-91C. Small aliquots of each sample (tens of milligrams) were placed in a 900° C. furnace that stripped mercury from the solid and reduced it to zerovalent form. The released mercury was then swept in a gas flow into the measuring chamber where total mercury was determined by integrating the signal and multiplying by a calibration factor. The device was calibrated with a NIST 2710 standard soil containing 32.6 wppm mercury. The downstream iodated carbon trap optionally was ground and similarly analyzed to compute independently the quantity of mercury passing through the test sample (i.e., not trapped by the test sample) for material balance closure. Data are expressed as percentage of total incident mercury that was trapped by each sample. Data using this test method in the Examples are tabulated in Table 1, infra.

Without limitation, the examples which follow demonstrate the surprising and unexpectedly high efficiencies and capacities of the compositions of the present invention useful for capturing mercury from flowing gas streams containing mercury.

EXAMPLES

Example 1

Comparative

A sample of untreated VAF-90 Activated Carbon Felt (ACF) [Shanghai No.1 ACF Company Co., Ltd. (Shanghai, China)] was heated to 200° C. in air in a muffle furnace for 30 minutes then cooled in air. This material was used as a control for testing of mercury binding affinity using the Alfa Screening Test, and results are compiled in Table 1.

Example 2

An approximately 10 foot long ×5.5 inch wide roll of VAF-90 activated carbon felt (ACF) was processed in a laboratory-scale prototype web coating apparatus consisting of a payoff roller feeding a dip roller leading to a heated static immersion tank containing dry dimethylsulfoxide (DMSO) exposed to air kept at nom. 60° C. The ACF tape was moved through the liquid, contacting the DMSO for about 3 seconds then passed over a drip bar and through a pair of unheated, crowned chrome rollers configured as a constant pressure nip to squeeze out excess liquid. The ACF tape was taken up on a take-up reel, cut into 3 pieces, and hung within a vented solvent-rated oven set to a 200° C. set point for about 45 minutes. The samples gave off thick smoke for about 10 minutes. The samples were cooled, air equilibrated in a laboratory hood, and blown clean of dust with an air hose. A portion of this material was subjected to spectroscopic analyses and another portion tested for mercury binding affinity using the Alfa Screening Test. The results are compiled in Table 1. Another portion was tested using the definitive Mercury Capture Efficiency and Capacity Test in the presence of $SO_2$, NO, and HCl, and results are compiled in Table 2.

Example 3

A twice-impregnated sample was prepared as follows: A 3.7 g portion of the finished tape of Example 2 was placed onto aluminum foil covering a laboratory hot plate in a laboratory hood and warmed to about 50-70° C. Excess DMSO (27.6 g) was again impregnated onto the sample with a dropping pipette until the sample was wet but not dripping. The moist solid was placed onto a curved stainless steel screen that allowed air to circulate underneath the felt layer in a preheated, vented, explosion-safe muffle furnace, set to 200° C. for 22 minutes. Smoking ceased after about 12 minutes. No significant weight gain was evident after treatment. Portions of this material were subjected to spectroscopic analyses, Frazier testing, and BET surface area measurements using nitrogen porosimetry. Another portion was tested for mercury binding affinity using the Alfa Screening Test. Results are compiled in Table 1. Another portion was tested using the definitive Mercury Capture Efficiency and Capacity Test in the presence of $SO_2$, NO, and HCl, and results are compiled in Table 2.

Example 4

A weighed sample of VAF-90 activated carbon felt (ACF) was placed onto aluminum foil covering a laboratory hot plate and heated in air to approximately 90° C. in a hood. A warm solution of 0.32 M 5-amino-1,3,4-thiadiazole-2-thiol (ATDT) [Alfa-Aesar] in wet di-methylsulfoxide was impregnated into the ACF from both sides while hot, and then the felt blotted to remove excess solution. The moist solid was placed onto a curved stainless steel screen that allowed air to circulate underneath the felt layer in a preheated vented, explosion-safe muffle furnace set to 220° C. The sample was heated in air for 66 minutes, then cooled in air; emitted fumes ceased after approximately 20 minutes in the furnace. A small amount of yellow powder was blown off of the dry sample and the sample weighed after equilibration to constant weight, indicating a 3.9 weight percent gain relative to the untreated ACF. A portion of this material was subjected to elemental and spectroscopic analyses and another portion tested for mercury binding affinity using the Alfa Screening Test. Results are compiled in Table 1. Another portion was tested using the definitive Mercury Capture Efficiency and Capacity Test in the presence of $SO_2$, NO, and HCl, and results are compiled in Table 2.

Example 5

A sample was prepared by impregnation of warm VAF-90 activated carbon felt (ACF) to incipient wetness with a warm 0.32 M solution of 5-amino-1,3,4-thiadiazole-2-thiol (ATDT) [Alfa-Aesar] in wet dimethylsulfoxide. After reheating, the moistened sample was again impregnated with an aqueous solution containing 1.05 F potassium iodide and 0.26 F magnesium chloride adjusted to pH 8.0 with aqueous potassium hydroxide solution until the substrate was wet but not dripping. The wet sample was placed onto a curved stainless steel screen and heat treated in a preheated vented, explosion-safe muffle furnace set to 220° C. for 18 hours, then cooled in air. The sample had gained 43 weight percent. A portion of the sample was sent to a commercial laboratory for elemental analysis, and other portions were subjected to the Frazier test and other physical tests. A portion was tested using the definitive Mercury Capture Efficiency and Capacity Test in the presence of $SO_2$, NO, and HCl. Results are compiled in Table 2.

Example 6

A concentrated solution of zinc diethyl-dithiocarbamate [Aldrich] in dry dimethylsulfoxide was used to impregnate a pre-weighed layer of VAF-90 activated carbon felt (ACF) on a heated metal platen to incipient wetness. The treated ACF was placed onto a curved stainless steel screen in a preheated, vented, explosion-safe muffle furnace set to 200° C. for about 1 hour, then cooled in air. After equilibration with room air, the pyrolyzed sampled was weighed, indicating a 4.8% weight gain relative to the untreated ACF. Multiple portions of this sample were tested using the Alfa Screening Test. Results are compiled in Table 1. Another portion was tested using the definitive Mercury Capture Efficiency and Capacity Test in the presence of $SO_2$, NO, and HCl. Results are compiled in Table 2. Other portions of this sample were subjected to TGA/DTA analysis under flowing air and to inverse gas chromatography measurements using tertiary butanol, acetic acid, and other adsorbates. Still other portions of this material were examined by SEM-EDS.

Example 7

A sample was prepared by the procedure described in Example 4 except that a 4:3 (wt:wt) solution of dry isopropanol: dry dimethylformamide was substituted for the dimethylsulfoxide solvent for 5-amino-1,3,4-thiadiazole-2-thiol (ATDT) [Alfa-Aesar]. After impregnation the sample was heat treated in an oven set to 200° C. rather than 220° C. for 1 hour, but a temperature excursion occurred bringing the maximum oven temperature to 211° C. A portion of this sample was tested in the Alfa Screening Test; see Table 1. Another portion of the sample was tested by inverse gas chromatography.

Example 8

A solution of 9.9 g zinc diethyl-dithiocarbamate (Zn (Et$_2$DTC)$_2$) in 100 mL dimethylformamide was prepared by heating and stirring for about 0.5 h. A portion of ACF weighing 10.54 g was placed onto aluminum foil covering a laboratory hot plate and heated to about 70-90° C. The ACF was impregnated evenly to incipient wetness using a dropping pipette with a portion of the hot solution of Zn(Et$_2$DTC)$_2$ and then calcined in air at 180° C. in a preheated, vented, explosion-safe muffle furnace for 55 minutes. After cooling and equilibration, the sample weighed 18.38 g, indicating a 42.6% loading. A portion of this material was subjected to elemental and spectroscopic analyses including XPS determination of the Zn: C atomic ratio on the surface in different geometric locations across the sample. Another portion was tested for mercury binding affinity using the Alfa Screening Test, and results are compiled in Table 1.

Example 9

Comparative

This comparative example illustrates an attempt to prepare a mercury-absorbing filter using a sulfur compound as a precursor to pyrolysis onto ACF whose structure does not feature the characteristic structural moiety essential to the present invention. A solution was prepared by dissolving 4.9 g of 2-mercaptopyrimidine, 98% (HPYM) [Aldrich] in 104.7 g. dry dimethylformamide with magnetic stirring and heating on a hot plate for about 20 minutes. Activated carbon felt was impregnated with the hot, yellow solution to incipient wetness by evenly wetting the ACF with a dropping pipette. Excess solution was removed by blotting, and the impregnated ACF then was calcined in air at 190° C. for 40 minutes, resulting in a 9% loading. A portion of this material was subjected to spectroscopic analyses and another portion tested for mercury binding affinity using the Alfa Screening Test. Results are compiled in Table 1.

Example 10

Comparative

This comparative example illustrates another attempt to prepare a mercury-absorbing filter using sulfur compounds whose structures do not feature the characteristic structural moiety essential to the present invention as precursors to pyrolysis onto ACF, in this case the formulation containing elemental sulfur and a non-conforming sulfur-containing solvent. Elemental sulfur (1.8 g.) was dissolved into about 15 mL of carbon disulfide solvent with stirring in air. A small sample of VAF-90 activated carbon felt (ACF) was heated on aluminum foil covering a laboratory hot plate and impregnated while hot to incipient wetness with the sulfur/carbon disulfide solution. The wet sample was placed onto a curved stainless steel screen and heat treated in a preheated, vented, explosion-safe muffle furnace set to 220° C. for about 20 minutes, then cooled in air. Residual solvent apparently burned off in the oven. A portion of this material was subjected to spectroscopic analyses and another portion was tested for mercury binding affinity using the Alfa Screening Test. Results compiled in Table 1.

Example 11

Comparative

This comparative example illustrates another attempt to prepare a mercury-absorbing filter using a precursor compound similar in structure to an effective precursor sulfur compound but whose specific structure does not feature the characteristic structural moiety for precursors to pyrolysis onto ACF that is essential for the present invention. In this case, the formulation contained a non-chelated salt of diethyldithiocarbamate that does not feature the essential constraining structural moiety described hereinabove. A 2.8 g sample of VAF-90 activated carbon felt was placed onto a laboratory hot plate covered with aluminum foil and heated to a high temperature at a number 4 setting of the hot-plate heater. The temperature of the substrate was not measured in this case. Approximately 7 grams of ammonium diethyldithiocarbamate [Aldrich] were dissolved into about 40 mL of deionized water. A portion of the aqueous solution was used to impregnate the hot ACF from each side with a dropping pipette until wet but not dripping. The sample was heat treated in a muffle furnace in air for 35 minutes at 200° C., then cooled in air. A portion of this sample was tested for mercury binding affinity using the Alfa Screening Test. Results are compiled in Table 1.

Example 12

Comparative

This comparative example illustrates an attempt to prepare a mercury-absorbing filter using a sulfur compound as a precursor to pyrolysis onto ACF whose structure does not feature the characteristic structural moiety essential for the present invention. A 12% by weight solution was prepared by dissolving 4,4'-thiobisbenzenethiol, 98% (TBBT) [Aldrich] in dry dimethylformamide with magnetic stirring and heating on a hot plate. A sample of pre-heated activated carbon felt, approx. 1.9 g, was impregnated with the hot solution with a dropping pipette. The impregnated ACF then was calcined in air at 200° C. for 22 minutes, resulting in a 53% loading. A portion of this material was subjected to spectroscopic analyses and another portion tested for mercury binding affinity using the Alfa Screening Test. Results are compiled in Table 1.

Example 13

Comparative

This comparative example illustrates a failed attempt to prepare a highly mercury-absorbing solid material suitable for flue-gas filtration. A layer of activated carbon fiber (ACF) was warmed and impregnated to incipient wetness with a 15% aqueous solution of 2,4,6-Trimercapto-s-triazine, trisodium salt [Degussa, Inc., TMT-15®. The sample was dried at approximately 25° C. but not calcined. A portion of this material was tested for mercury binding affinity using the Alfa Screening Test. Results are compiled in Table 1.

Example 14

Comparative

This comparative example illustrates a failed attempt to prepare a highly mercury-absorbing material by using a compound expected to be a possible product of oxidation of dimethylsulfoxide. Methylsulfone, 98% [Aldrich], 4.0 g, were dissolved into about 40 mL of deionized water. A piece of ACF weighing 2.73 g was impregnated while hot with this solution until it became saturated. The sample was calcined in air for over 3 hours at 200° C. This sample was tested for mercury binding ability using a variant of the Alfa test described previously but in which no sulfur oxide, nitrogen oxide, or hydrogen chloride were added to the feed, and the sample temperature was kept at approximately 180° C. during the test. No significant enhanced mercury adsorption was detected relative to untreated ACF control. Another small portion of this sample was placed in a PTFE-lined pressure vessel along with a similar weight of a control sample of untreated ACF. The autoclave vessel was charged with a drop of elemental mercury, sealed in air, and placed into a 190° C. oven for 5 days under autogenous pressure, then cooled. Elemental analysis for residual mercury in the two substrates by an external laboratory using the PIXE method showed essentially no difference in mercury pickup between the two samples within the sensitivity of the analytical method.

Example 15

Comparative

This comparative example illustrates a failed attempt to prepare a highly mercury-absorbing material by using a precursor compound containing sulfur and oxygen atoms but not containing the structural linkage described earlier as necessary for the present invention, and by not conducting the required pyrolysis step after impregnating ACF. Tetramethylene sulfone (also known as sulfolane), 99% [Aldrich], 15.6 g, was impregnated onto 2.15 g. hot ACF, but the resulting sample was not calcined. The dampened ACF, approx. 88% loaded, was tested as described in Example 14 using the variant to the Alfa Screening test, except that an external laboratory was used to conduct mercury analysis relative to untreated ACF control. The results are expressed as mercury percentage of the weight not including sulfolane. The treated sample did not show enhanced mercury absorption relative to the control run.

Example 16

Comparative

This comparative example illustrates a failed attempt to prepare a highly mercury-absorbing material by use of a compound containing both a non-sulfur potential ligand for mercury (II) supported onto ACF along with the addition of a known catalyst component for mercury oxidation by oxygen: A 3 M aqueous solution of the disodium salt of 5-amino-2,4, 6-triiodoisophthalic acid, $Na_2$(ATIIP), was prepared by titration of the solid acid [Aldrich] with 6 N sodium hydroxide solution to a pH 8 endpoint. A 2.6 g sample of activated carbon fiber (ACF) was heated on aluminum foil covering a laboratory hot-plate and impregnated to incipient wetness using the aqueous solution of $Na_2$(ATIIP). The solid was then calcined in air at 225° C. for 45 minutes, then cooled in air, resulting in an approximately 56% loading. An aqueous solution was prepared by addition of 0.038 g of palladium chloride [Aldrich] to 3.0 g deionized water along with 10 drops of acetic acid followed by heating and magnetic stirring. The solid did not completely dissolve after about 15 minutes, so the solution was filtered and diluted with additional water. The treated ACF was pre-wet with a small amount of isopropyl alcohol, then impregnated to incipient wetness with the acidic palladium solution. The sample was then dried in an oven at 160° C. for 20 minutes. A portion of this material was tested for mercury binding affinity using the Alfa Screening Test. Results are compiled in Table 1.

Example 17

Comparative

This example illustrates the performance of a composition in which silica gel powder was used in place of a carbonaceous substrate. Silica gel powder of 63-200 mesh, 7.1 g [Selecto Scientific catalog number 146644] was weighed into a borosilicate glass Petri dish. The sample was impregnated to a point just beyond incipient wetness with a hot solution of 0.32 M 5-amino-1,3,4-thiadiazole-2-thiol (ATDT) [Alfa-Aesar] in wet dimethylsulfoxide. The moistened powder then was well-mixed and placed into a solvent-rated, vented muffle furnace at about 220° C. for 1 hour, then cooled in air. The resulting powder displayed an approximately 6.5% weight gain after equilibration and was tested using the Alfa Screening Test. Results are compiled in Table 1.

Example 18

Comparative

This comparative example illustrates the performance of mercury absorbing filter materials described previously in commonly assigned U.S. patent application Ser. No. 10/272, 487, described above, under the severely deactivating conditions of the Alfa Screening Test and the definitive Mercury Capture Efficiency and Capacity Test, in the presence of varying levels of $SO_2$, NO, HCl, and inlet mercury concentration: Samples of mercury trapping filter materials were prepared according to the procedure described in Example 1 of U.S. patent application Ser. No. 10/272,487, except that the oven treatment temperature was 215° C. Portions of this material were tested using the Alfa Screening Test. Results are compiled in Table 1. Other portions were tested using the definitive Mercury Capture Efficiency and Capacity Test, and results are compiled in Table 2, in the presence of varying levels of $SO_2$, NO, HCl, and Hg inlet concentrations, as reported in the Tables.

Example 19

Comparative

A sample was prepared similarly to Example 18 except that a second impregnation with dilute aqueous KOH was applied to the substrate after initial heat treatment, followed by a second drying step at 215° C. Results from testing of this sample using the definitive Mercury Capture Efficiency and Capacity Test are listed in Table 2.

Example 20

Prototype mercury absorbing filters in the form of inserts within Remedia® brand [W. L. Gore & Associates, Inc. (Elkton, Md.] pulse-jet filter bags were prepared as follows: 5-Amino-1,3,4-thiadiazole-2-thiol (ATDT), 143.2 g, was dissolved into 2 L of anhydrous dimethylsulfoxide with stirring and heating to 40° C. Two rectangular pieces of ACF, each cut to 16 inches by 36 inches, were soaked in the hot solution, then lightly squeezed with a roller assembly to remove excess liquid. Cylindrical wire cages made of stainless steel with a welded bottom cap, nominally 4.8 inch outer diameter and 3 ft long, were spiral wound with a 9-inch wide, non-woven porous mat cloth made from pressed fluoropolymer fibers, with slight overlap between the turns, and taped with glass tape. The wetted ACF was wrapped around the cage over the fluoropolymer cloth with approximately 1 inch overlap of the ends and tied to the cage temporarily with 1 inch strips of PTFE felt cloth [Gore P/N 8383]. The two wrapped cages were placed in a vented, solvent-rated 220° C. industrial furnace for one hour and two hours, respectively. After cooling in air, the temporary ties were removed and the outside of the assemblies spiral-wrapped with fluoropolymer non-woven cloth as before. Tight fitting top flanges and bottom cuffs of PTFE felt cloth [P/N 8383] were attached and the 3-layer assemblies held together with stainless steel compression band clamps. The caged assemblies were each inserted within 3-foot standard Gore Remedia brand pulse jet filter bags with laminated PTFE outer membranes/cage assemblies of slightly larger diameters than the mercury-absorbing insert diameters, resulting in tight fits. The minimal annular space between the two cage assemblies (for each insert) was sealed with the top cloth flange of the insert overlapping the metal top of the Remedia brand filter bag cage such that a gas flow would travel through the outer Remedia brand filter, then pass through the inner, mercury-trapping filter without bypassing. The top of each assembly was fitted with a Venturi for back pulse cleaning of the filters, and these two prototype assemblies were placed into a pilot-scale baghouse appended to the inlet ducts of an industrial full-scale baghouse such that mercury-containing process flue gas from the industrial process could be circulated through the prototype mercury-trapping-filter/pulse-jet filter bag assemblies. A standard design steel top flange bolted to the baghouse tube-sheet held each of the filter systems in place and prevented leakage of flue gas around the filters. Effectiveness of mercury removal from the process gas was monitored by measuring mercury concentration at the outlet of each baghouse-compartment containing the mercury trapping inserts, compared to isokinetic mercury concentration in the effluent of compartments containing control bags without inserts.

Example 21

The procedure of Example 17 was repeated except that a coconut shell carbon powder of 18-60 mesh [Barneby-Sutcliffe coconut shell C type CL-20] was substituted for the silica gel powder. The sample was pyrolyzed at 220° C. for 1 hour and had a final loading of about 9.1%. This sample was tested using the Alfa Screening Test. Results compiled in Table 1.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

TABLE 1

Alfa Screening Test: Relative Short-Term Mercury Adsorption from Simulated Flue Gas Containing Sulfur Dioxide

| Example number | Sample Description: Precursor compound(s)/solvent/ substrate/pyrolysis temperature (° C.) | $SO_2$ Conc. in Feed Gas (ppm) | Inlet Mercury Exposure (µg) | Relative Removal Efficiency (%) | Efficiency Category |
|---|---|---|---|---|---|
| 1 | Activated Carbon Fiber Felt (ACF), type VAF-90 | low | 52 | 21 | − |
| 2 | DMSO/ACF/200° | | 60 | 91 | ++ |
| 3 | 2x-DMSO/ACF/200° | | 48 | 92 | ++ |
| 4 | 3.9% ATDT/DMSO/ACF/220° | low | 59 | 92 | ++ |
| 6 | 4.8% Zn(Et$_2$DTC)$_2$/DMSO/ACF/200° | | 60 | 101 | +++ |
| 6 | 4.8% Zn(Et$_2$DTC)$_2$/DMSO/ACF/200° | | 300 | 72 | ++ |
| 6 | 4.8% Zn(Et$_2$DTC)$_2$/DMSO/ACF/200° | Very high | 53 | 98 | + |
| 7 | ATDT/DMF/ACF/200° | high | 60 | 52 | + |
| 8 | 43% Zn(Et$_2$DTC)$_2$/DMF/ACF/180° | | 53 | 64 | − |
| 9 | HPYM/DMF/ACF/190° | | 50 | 4 | − |
| 10 | Amorphous S/CS$_2$/ACF/220° | | 48 | 21 | − |
| 11 | (NH$_4$) (Et$_2$DTC)/H$_2$O/ACF/200° | | 48 | 22 | − |
| 12 | 53% TBBT/DMF/ACF/200° | | 48 | 14 | − |
| 13 | TMT-15/H$_2$O/ACF/25° | | 64 | 12 | − |
| 16 | Na$_2$ATIIP/Pd/H$_2$O/HOAc/ACF/225° | | 60 | 29 | 0 |
| 17 | 6.5% ATDT/DMSO/SiO$_2$ powder/220° | high | 48 | 27 | 0 |
| 18 | KI/KI$_3$/Zn(OAc)$_2$/H$_2$O/ACF/215° | low | 55 | 89-75 | ++ |
| 18 | KI/KI$_3$/Zn(OAc)$_2$/H$_2$O/ACF/215° | high | 61 | 50-14 | 0 |
| 21 | 9.1% ATDT/DMSO/ Coconut carbon powder/220° | high | 48 | 58 | + |

| Category | Relative Removal Efficiency Range |
|---|---|
| − | <25% (poor performance) |
| 0 | 25-50% (in range of Example 18 formulation in SO$_2$) |
| + | 51-70% |
| ++ | 71-95% |
| +++ | >95% |

TABLE 2

DEFINITIVE DYNAMIC MERCURY ADSORPTION CAPACITY
AND ADSORPTION EFFICIENCY TEST IN MODIFIED EPA REACTOR
SYSTEM USING VARIED COMPOSITION OF FLUE GASES CONTAINING
SULFUR AND NITROGEN OXIDES, HCl, WATER VAPOR, OXYGEN,
VARIOUS MERCURY CONCENTRATIONS, AND DIFFERENT FLOW
VELOCITIES, [$H_2O$] = 4 vol %, [$NO_x$] = 300 ppm [$O_2$] = 6 vol %, balance = $N_2$,
T = 150 +/− 2° C.

| Example # | Composition | [Hg], ppb | [$SO_2$], ppm | [HCl], ppm | Face Velocity, (ft/min) | Run time, (hrs) | Initial efficiency | Mercury adsorbed (mg Hg/g fresh substrate)[3] |
|---|---|---|---|---|---|---|---|---|
| — | Blank reactor | 1000 | 80 | 50 | 8 | 1.5[4] | 0 | 0 |
| 18 | KI/$KI_3$/Zn(OAc)$_2$/$H_2O$/ACF/215° | 1000 | 80 | 4 | 8 | 3[4] | 34.2 | 2.47 |
| 18 | KI/$KI_3$/Zn(OAc)$_2$/$H_2O$/ACF/215° | 1000 | 0[1] | 0 | 2 | 23 | 100 | >13.38[2] |
| 18 | KI/$KI_3$/Zn(OAc)$_2$/$H_2O$/ACF/215° | 1000 | 80 | 50 | 2 | 3 | 83.8 | 0.84 |
| 18 | KI/$KI_3$/Zn(OAc)$_2$/$H_2O$/ACF/215° | 40 | 80 | 4 | 2 | 18 | 100 | >0.40[2] |
| 18 | KI/$KI_3$/Zn(OAc)$_2$/$H_2O$/ACF/215° | 40 | 80 | 4 | 8 | 4.5 | 68.3 | 0.22 |
| 19 | KI/$KI_3$/Zn(OAc)$_2$/KOH/$H_2O$/ACF/215° | 1000 | 80 | 4 | 2 | 22 | 74.6 | 13.44 |
| 5 | 43% KI/basic $MgCl_2$/ATDT/DMSO/ACF/220° | 333 | 80 | 4 | 6 | 23 | 100 | 11.86 |
| 2 | DMSO/ACF/200° | 1000 | 80 | 4 | 2 | 34 | 100 | 32.4 |
| 4 | 3.9% ATDT/DMSO/ACF/220° | 1000 | 80 | 4 | 2 | 185 | 88 | 111 |
| 3 | 2X -DMSO/ACF/200° | 333 | 80 | 4 | 6 | 46 | 100 | 24.4 |
| 6 | 4.8% Zn($Et_2$DTC)$_2$/DMSO/ACF/200° | 333 | 80 | 4 | 6 | 19 | 95 | 16.76 |

FOOTNOTES:
[1] Nitrogen, oxygen, and water vapor only; no $SO_2$, $NO_x$ or HCl used for this run.
[2] Not complete because run terminated before efficiency dropped to 40%. This represents only a minimum capacity under these conditions.
[3] Mercury adsorption capacity measured to point at which efficiency dropped to less than 40% unless initial efficiency started below that point, in which case run time is arbitrary.
[4] Arbitrary run time for this run since initial efficiency already below 40%.

What is claimed is:

1. A composition for use in the capture of mercury from a gaseous mixture which contains mercury, said composition comprising a high-surface-area activated carbon substrate supporting thereon the product of the pyrolysis, in situ on said carbon substrate surface, of at least one sulfur compound selected from the group consisting of dimethyl sulfoxide; 2-amino-5-mercapto-1,3,4-thiadiazole (5-amino-1,3,4-thiadiazole-2-thiol); 2-benzoylamino-3-(4-chloro-phenyl)-thioacrylic acid S-(2-mercapto-4-methyl-phenyl) ester; zinc diethyldithiocarbamate; a mixture of dimethyl sulfoxide and 2-amino-5-mercapto-1,3,4-thiadiazole (5-amino-1,3,4-thiadiazole-2-thiol); and a mixture of dimethyl sulfoxide and zinc diethyldithiocarbamate.

2. The composition according to claim 1 having a carbon content of at least fifty percent (50%) by weight and a surface area of at least 200 $m^2g^{-1}$ B.E.T.

3. The composition according to claim 1 having a carbon content of at least fifty percent (50%) by weight and a surface area of at least 500 $m^2g^{-1}$ B.E.T.

4. The composition of claim 1 exhibiting a mercury capture capacity exceeding 10 mg Hg per gram of said composition.

5. The composition of claim 1 exhibiting a mercury capture capacity exceeding 20 mg Hg per gram of said composition.

6. The composition of claim 1 exhibiting a mercury capture capacity exceeding 30 mg Hg per gram of said composition.

7. The composition of claim 1 exhibiting a mercury capture capacity exceeding 100 mg Hg per gram of said composition.

8. The composition of claim 1 wherein said activated carbon substrate comprises activated carbon powder.

9. The composition of claim 1 wherein said activated carbon substrate comprises activated carbon fibers.

10. The composition of claim 1 wherein said activated carbon substrate comprises activated carbon felt.

* * * * *